(12) United States Patent
Xu et al.

(10) Patent No.: US 10,789,864 B2
(45) Date of Patent: Sep. 29, 2020

(54) DISPLAY SCREEN AND DISPLAY APPARATUS

(71) Applicant: BOE TECHNOLOGY GROUP CO., LTD., Beijing (CN)

(72) Inventors: Rui Xu, Beijing (CN); Xue Dong, Beijing (CN); Hailin Xue, Beijing (CN); Xiaochuan Chen, Beijing (CN); Haisheng Wang, Beijing (CN); Fuqiang Li, Beijing (CN); Lei Wang, Beijing (CN); Changfeng Li, Beijing (CN); Haifeng Xu, Beijing (CN); Yanzhao Peng, Beijing (CN); Weixin Meng, Beijing (CN); Dawei Shi, Beijing (CN); Jian Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 147 days.

(21) Appl. No.: 15/753,488

(22) PCT Filed: May 3, 2017

(86) PCT No.: PCT/CN2017/082879
§ 371 (c)(1),
(2) Date: Feb. 19, 2018

(87) PCT Pub. No.: WO2017/193847
PCT Pub. Date: Nov. 16, 2017

(65) Prior Publication Data
US 2018/0240377 A1    Aug. 23, 2018

(30) Foreign Application Priority Data

May 13, 2016   (CN) .......................... 2016 1 0320317

(51) Int. Cl.
*G09F 9/302* (2006.01)
*G09F 9/30* (2006.01)
(Continued)

(52) U.S. Cl.
CPC ........ *G09F 9/3023* (2013.01); *G02F 1/13306* (2013.01); *G02F 1/13454* (2013.01);
(Continued)

(58) Field of Classification Search
CPC ........... G02F 1/13306; G02F 1/133308; G02F 1/134327; G02F 1/13454; G02F 1/136286; G02F 2201/56
See application file for complete search history.

(56) References Cited

U.S. PATENT DOCUMENTS

2002/0075440 A1   6/2002  Deane
2007/0279569 A1* 12/2007  Koishi .............. G02F 1/134327
                                                     349/149
(Continued)

FOREIGN PATENT DOCUMENTS

CN       1404583 A       3/2003
CN     101536064 A       9/2009
(Continued)

OTHER PUBLICATIONS

First Chinese Office Action, for Chinese Patent Application No. 201610320317.2, dated Sep. 4, 2017, 12 pages.
(Continued)

*Primary Examiner* — Sahlu Okebato
(74) *Attorney, Agent, or Firm* — Kinney & Lange, P.A.

(57) ABSTRACT

The present disclosure provides a display screen and a display apparatus, the display screen comprising: a special-shaped display panel (01) of an irregular closed shape, and a display driving circuit (02) which is bonded at any edge of the special-shaped display panel (01) and configured to
(Continued)

supply respective signals to gate lines and data lines in the special-shaped display panel (01).

11 Claims, 7 Drawing Sheets

(51) Int. Cl.
| | | |
|---|---|---|
| *G02F 1/1345* | (2006.01) | |
| *G02F 1/133* | (2006.01) | |
| *G02F 1/1333* | (2006.01) | |
| *G02F 1/1343* | (2006.01) | |
| *G02F 1/1362* | (2006.01) | |
| *G09G 3/36* | (2006.01) | |
| G09G 3/20 | (2006.01) | |

(52) U.S. Cl.
CPC .. *G02F 1/133308* (2013.01); *G02F 1/134327* (2013.01); *G02F 1/136286* (2013.01); *G09F 9/30* (2013.01); *G09G 3/3611* (2013.01); *G02F 2201/56* (2013.01); *G09G 3/20* (2013.01)

(56) References Cited

U.S. PATENT DOCUMENTS

| | | |
|---|---|---|
| 2008/0012794 A1 | 1/2008 | Battersby |
| 2009/0102824 A1* | 4/2009 | Tanaka .............. G02F 1/134309 |
| | | 345/205 |
| 2009/0195721 A1 | 8/2009 | Tanahara |
| 2010/0156945 A1 | 6/2010 | Yoshida |
| 2017/0003541 A1 | 1/2017 | Xu et al. |

FOREIGN PATENT DOCUMENTS

| | | |
|---|---|---|
| CN | 104900181 A | 9/2015 |
| CN | 105425486 A | 3/2016 |
| CN | 105788462 A | 7/2016 |
| CN | 205680367 U | 11/2016 |
| JP | 2000347600 A | 12/2000 |
| TW | 200630725 A | 9/2006 |

OTHER PUBLICATIONS

International Search Report & Written Opinion, for PCT Patent Application No. PCT/CN2017/082879, dated Aug. 2, 2017, 21 pages.

* cited by examiner

DISPLAY SCREEN AND DISPLAY APPARATUS

CROSS-REFERENCE TO RELATED APPLICATION

This application is the national phase of PCT Application No. PCT/CN2017/082879 filed on May 3, 2017, which in turn claims priority of the Chinese Patent Application No. 201610320317.2 entitled "A Special-Shaped Display Screen", filed with the State Intellectual Property Office of China on May 13, 2016, which is incorporated herein by reference in its entirety.

BACKGROUND OF THE DISCLOSURE

Field of the Disclosure

The embodiments of the present disclosure relate to the field of display technology, in particular to a special-shaped display screen and a display apparatus comprising the special-shaped display screen.

Description of the Related Art

Nowadays, the special-shaped display screens such as the wearable displays and the displays susceptible to be equipped on the dashboard of automobiles have drawn much attention in the display market. With the development of the manufacturing process of display screens, it is increasingly desirable to design the demanded display terminals with specific shapes suitable as various business identifiers (logo) or for commercial advertising.

SUMMARY

Therefore, it is a technical problem to be solved by the skilled person in the art to realize the narrow-frame design for the special-shaped display screen so as to increase the effective display area of the special-shaped display screen.

In view of this, an object of the embodiments of the present disclosure is to provide a special-shaped display screen, so as to at least partially enable the displaying with a special-shaped screen having a narrow frame.

In embodiments of the present disclosure, a special-shaped display screen is provided, comprising: a special-shaped display panel of an irregular shape, the special-shaped display panel comprising a rectangular region and a special-shaped region; and a display driving circuit which is bonded at any edge of the special-shaped display panel and configured to supply signals to gate lines and data lines in the special-shaped display panel.

In a possible implementation, in the above-mentioned special-shaped display screen provided by the embodiments of the present disclosure, the edge at which the display driving circuit is bonded is a short side of a circumscribed rectangle of the special-shaped display panel.

In a possible implementation, in the above-mentioned special-shaped display screen provided by the embodiments of the present disclosure, the special-shaped display panel is of an irregular solid shape; and the special-shaped display panel is divided along the short side into a first region with a rectangle shape, and a second region with an irregular shape;

in active displaying areas of the first and second regions, the data lines are arranged as vertical straight lines in column gaps between sub-pixels; and the data lines in the second region are connected to the display driving circuit by data lead wires; the data lead wires comprise: vertical data lead wires arranged in the first region and having an extending direction consistent with that of the data lines, and horizontal data lead wires which connect the data lines in the second region with the vertical data lead wires and have an extending direction consistent with that of the gate lines.

In a possible implementation, in the above-mentioned special-shaped display screen provided by the embodiments of the present disclosure, the special-shaped display panel is of an irregular hollow shape, and its outer contour comprises several arc sections with different central angles; and the special-shaped display panel is divided along the short side into a first region with a rectangle shape, a third region comprising a hollow portion, and a fourth region comprising the arc sections;

in active displaying areas of the first, third and fourth regions, the data lines are arranged as vertical straight lines in column gaps between sub-pixels;

the data lines in the third region are connected to the display driving circuit by data lead wires; the data lead wires comprise: vertical data lead wires arranged in the first or fourth region and having an extending direction consistent with that of the data lines, and horizontal data lead wires which connect the data lines in the third region with the vertical data lead wires and have an extending direction consistent with that of the gate lines; and the data lines in the fourth region are connected to the display driving circuit by data lead wires; the data lead wires comprise: vertical data lead wires arranged in the fourth region and having an extending direction consistent with that of the data lines, and horizontal data lead wires which connect the data lines in the fourth region with the vertical data lead wires and have an extending direction consistent with that of the gate lines.

In a possible implementation, in the above-mentioned special-shaped display screen provided by the embodiments of the present disclosure, the special-shaped display panel is divided along its long side into a fifth region of a closed shape, and a sixth region comprising a hollow portion;

in active displaying areas of the fifth and sixth regions, the gate lines are arranged as horizontal straight lines in row gaps between sub-pixels; and the gate lines in the sixth region are connected to the display driving circuit by gate lead wires; the gate lead wires comprise: horizontal gate lead wires arranged in the fifth region and having an extending direction consistent with that of the gate lines, and vertical gate lead wires which connect the gate lines in the sixth region with the horizontal gate lead wires and have an extending direction consistent with that of the data lines.

In a possible implementation, in the above-mentioned special-shaped display screen provided by the embodiments of the present disclosure, the vertical data lead wires are arranged in column gaps between sub-pixels, and/or in a non-displaying area;

In a possible implementation, in the above-mentioned special-shaped display screen provided by the embodiments of the present disclosure, the vertical data lead wires are arranged in a same layer as the data lines, or the vertical data lead wires are arranged in different layers from the data lines and in such a way that their orthogonal projections on a substrate overlap at least partially orthogonal projections of the data lines on the substrate;

In a possible implementation, in the above-mentioned special-shaped display screen provided by the embodiments of the present disclosure, the horizontal gate lead wires are arranged in row gaps between sub-pixels, and/or in a non-displaying area;

In a possible implementation, in the above-mentioned special-shaped display screen provided by the embodiments of the present disclosure, the horizontal gate lead wires are arranged in a same layer as the gate lines, or the horizontal gate lead wires are arranged in different layers from the gate lines and in such a way that their orthogonal projections on a substrate overlap at least partially orthogonal projections of the gate lines on the substrate;

In a possible implementation, in the above-mentioned special-shaped display screen provided by the embodiments of the present disclosure, the lead wires are situated at least partially in the rectangular region.

In a possible implementation, in the above-mentioned special-shaped display screen provided by the embodiments of the present disclosure, the display driving circuit is bonded at an upper or lower edge of the special-shaped display panel.

In a possible implementation, in the above-mentioned special-shaped display screen provided by the embodiments of the present disclosure, the horizontal data lead wires are arranged in row gaps between sub-pixels, and/or in a non-displaying area.

In a possible implementation, in the above-mentioned special-shaped display screen provided by the embodiments of the present disclosure, the horizontal data lead wires are arranged in a same layer as the gate lines, or the horizontal data lead wires are arranged in different layers from the gate lines and in such a way that their orthogonal projections on a substrate overlap at least partially orthogonal projections of the gate lines on the substrate.

In a possible implementation, in the above-mentioned special-shaped display screen provided by the embodiments of the present disclosure, the vertical gate lead wires are arranged in column gaps between sub-pixels, and/or in a non-displaying area.

In a possible implementation, in the above-mentioned special-shaped display screen provided by the embodiments of the present disclosure, the vertical gate lead wires are arranged in a same layer as the data lines, or the vertical gate lead wires are arranged in different layers from the data lines and in such a way that their orthogonal projections on a substrate overlap at least partially orthogonal projections of the data lines on the substrate.

In a possible implementation, in the above-mentioned special-shaped display screen provided by the embodiments of the present disclosure, the display panel is of a shape of a character "E", the rectangular region comprises the first region, and the special-shaped region comprises the second region.

In a possible implementation, in the above-mentioned special-shaped display screen provided by the embodiments of the present disclosure, the display panel is of a shape of a character "B", the rectangular region comprises the first and/or fifth region, and the special-shaped region comprises the third, fourth and sixth regions.

In a possible implementation, in the above-mentioned special-shaped display screen provided by the embodiments of the present disclosure, the special-shaped display panel is of a shape of a character, a shape of a numeral or a shape of a logo comprising a character and/or a numeral.

In a possible implementation, in the above-mentioned special-shaped display screen provided by the embodiments of the present disclosure, the special-shaped display panel is any one selected from a group consisting of a liquid crystal display panel, an electroluminescent display panel, a plasma display panel and an electronic paper.

The embodiments according to another aspect of the present disclosure provide a display apparatus comprising the above-mentioned display screen.

DETAILED DESCRIPTION OF PREFERRED EMBODIMENTS OF THE DISCLOSURE

Figure 1:
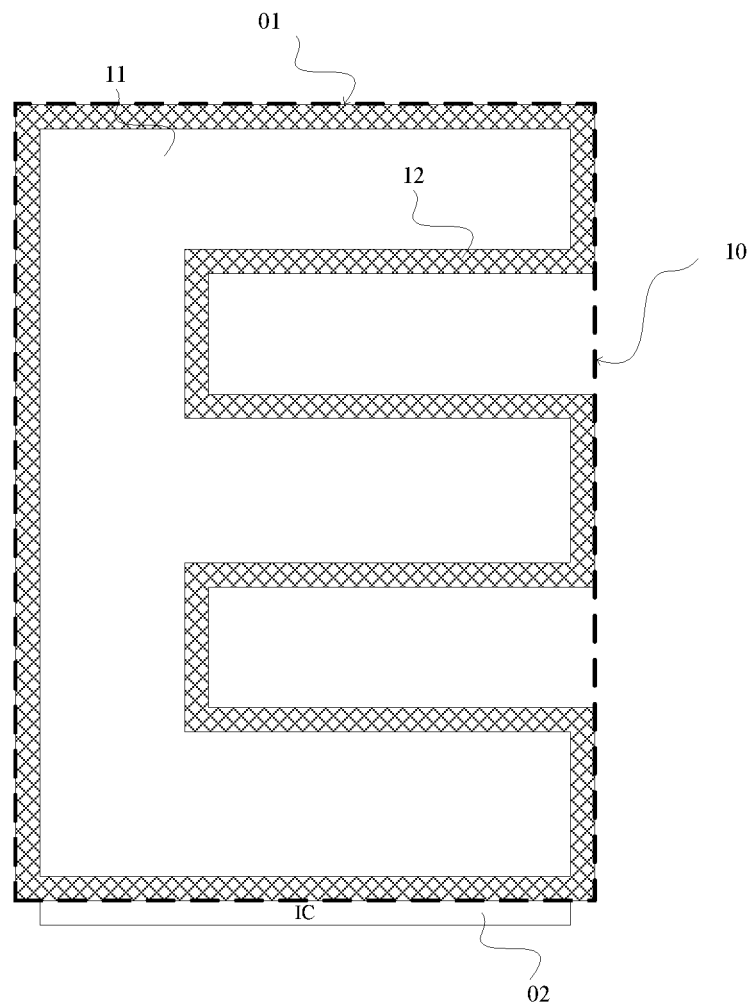
FIG. 1 is a planar schematic view of the structure of a special-shaped display screen provided by an embodiment of the present disclosure.

Technical solutions of the embodiments of the present disclosure will be described hereinafter clearly and completely with reference to the drawings of the embodiments of the present disclosure, so that the objects, technical solutions and advantages of the embodiments of the present disclosure appear more clearly. Obviously, the described embodiments are some of the embodiments of the present disclosure, not all the embodiments. All other embodiments that can be obtained by a person skilled in the art in the light of the described embodiments of the present disclosure without exercising inventive skill shall fall within the protection scope of the present disclosure.

The technical or scientific terms used for the present disclosure shall have the conventional meanings that a person skilled in the art understands, unless otherwise defined. The terms "first", "second" and the like used for the present disclosure do not imply any sequence, amount or importance; they just function to distinguish different constituent parts. The terms "vertical" and "horizontal" used for the present disclosure have relative meanings instead of absolute meanings. For example, the word "vertical" can be construed as referring to a first direction and the word "horizontal" as referring to a second direction generally perpendicular to the first direction. The terms "include" or "contain" and the like mean that the element or article preceding these terms covers the element or article or the equivalent thereof enumerated after these terms, without excluding other elements or articles. The terms "connect" or "interconnect" and the like do not confine themselves to a physical or mechanical connection. Rather, it can involve an electrical connection, either directly or indirectly. The terms "upper", "lower", "right" and "left" and the like only express relative positional relationship; if the absolute position of the described object changes, the relative positional relationship may also change correspondingly.

In the embodiments and the drawings of the present disclosure, the same reference signs have the same meaning, unless otherwise defined. Furthermore, in the drawings of the embodiments of the present disclosure, only the structures to which the embodiments of the present disclosure relate are illustrated and other structures can be referred to a conventional design. In the drawings describing the embodiments of the present disclosure, the thicknesses of the layers or regions are exaggerated for the purpose of clarity. It is to be understood that when such an element as a layer, a film, a region or a base substrate is referred to as situating "above" or "under" another element, the element may "directly" situate "above" or "under" the other element, or there may be an interposed element between them.

FIG. 1 is a planar schematic view of the structure of a special-shaped display screen provided by an embodiment of the present disclosure. As shown in FIG. 1, the special-shaped display screen comprises: a special-shaped display panel 01 of an irregular closed shape, and a display driving circuit 02 which is bonded at any edge of the special-shaped display panel 01 and configured to supply respective signals to the gate lines and the data lines in the special-shaped display panel 01.

In the special-shaped display screen provided by the above-mentioned embodiment of the present disclosure, an IC chip which can supply signals to both the gate lines and the data lines is bonded at an edge of the special-shaped display panel, and by this way the other frames of the special-shaped display screen on which no IC chip is bonded can be designed to be narrow frames. Thus, the width of the frames of the special-shaped display screen is reduced as far as possible to realize the display with a special-shaped display having narrow frame.

In particular, in the above-mentioned special-shaped display screen provided by the embodiments of the present disclosure, the edge at which the display driving circuit 02 is bonded can be a short side of the circumscribed rectangle 10 of the special-shaped display panel 01, the circumscribed rectangle 10 being defined as the smallest rectangle that covers the special-shaped display panel, that is, the circumscribed rectangle of the illustrated pattern when regarded as a closed shape. FIG. 1 illustrates an example in which the special-shaped display panel 01 is of the specific shape of character "E". The special-shaped display panel 01 of the shape of character "E" includes a displaying area 11 which displays a pattern and a non-displaying area 12 which displays no pattern. The circumscribed rectangle 10 of the special-shaped display panel 01 having the shape of character "E" is shown by broken lines in FIG. 1. In this case, the short side of the circumscribed rectangle 10 of the special-shaped display panel 01 is the upper or lower edge of the special-shaped display panel 01 having the shape of character "E". A display driving circuit 02 (IC chip) which can supply signals to both the gate lines and the data lines is bonded in the non-displaying area of the upper or lower edge of the special-shaped display panel 01 having the shape of character "E", and by this way the other frames of the special-shaped display screen on which no IC chip is bonded can be designed to be narrow frames. Thus, the width of the frames of the special-shaped display screen is reduced as far as possible to realize the display with a special-shaped display having narrow frame. It is to be understood that the size of the display driving circuit 02 determines the length or area that the driving circuit occupies of the short side, and that the specific edge at which the driving circuit is arranged or the position in the selected edge can be selected as needed and is not limited to the short side of the circumscribed rectangle as shown in drawings. In the above-mentioned special-shaped display panel 01 provided by the embodiments of the present disclosure, the signals of the gate lines and the data lines are all sent out by the IC chip at the short side of the special-shaped display panel 01, and the specific wiring layout of the gate lines and the data lines depends on the specific shape of the special-shaped display panel 01, for example different designs at sites with different shapes such as an arc or a ring. As an example, in a special-shaped display panel used for vehicle mounted series rear-view mirrors etc, with a circular, elliptical or closed curved shape, the special-shaped display panel can be divided into a normal region of a regular rectangular shape and a special-shaped region of an irregular shape. In the normal region the gate lines and the data lines may be connected to the IC chip by a conventional pixel design, whereas in the special-shaped region the gate lines and the data lines cannot be connected to the IC chip after running exactly in a row or column. Hereinafter the specific wiring of the gate lines and the data lines in the special-shaped display panel with different types of special-shaped regions will be described in detail.

In the present disclosure, on the special-shaped display panel, one or more rectangular regions or generally rectangular regions are identified and the rest region excluding the above-mentioned rectangular regions is regarded as at least one special-shaped region. As such, the gate lines and the data lines in the rectangular regions can be connected to the IC chip in accordance with the conventional design in the related art, whereas in the special-shaped region they will be connected via the lead wires arranged in at least partial space of the rectangular regions and be finally connected to the IC chip. Hereinafter, description will be made with reference to the example of a display panel of a shape of "E" or "B". Obviously, the same solution applies to other special-shaped display panels, for example a display panel of a shape of a character (except those characters above-mentioned), a shape of a numeral or a shape of a logo comprising a character and/or a numeral. For the sake of simplicity and clarity, detailed descriptions one by one are dispensed with.

It shall be noted that the above-mentioned rectangular regions may include an active displaying region inside the rectangular regions and a non-displaying region at the periphery of the active displaying region. That is, under some circumstances, the rectangular regions include not only an active displaying region, but also a non-displaying region. The above-mentioned special-shaped region is intended to refer to not only a region of a nonrectangular shape, but also a region of a rectangular shape but with an inner or partial hollow portion. That is, the special-shaped region described herein can be broadly construed as the rest portion excluding the above-mentioned rectangular regions, that is, the region in which the data lines and the gate lines cannot be designed in accordance with the conventional design schemes. It shall be noted that, under some circumstances, the special-shaped region may also include an active displaying region therein and a non-displaying region at the periphery of or inside the active displaying region.

Figure 2A:
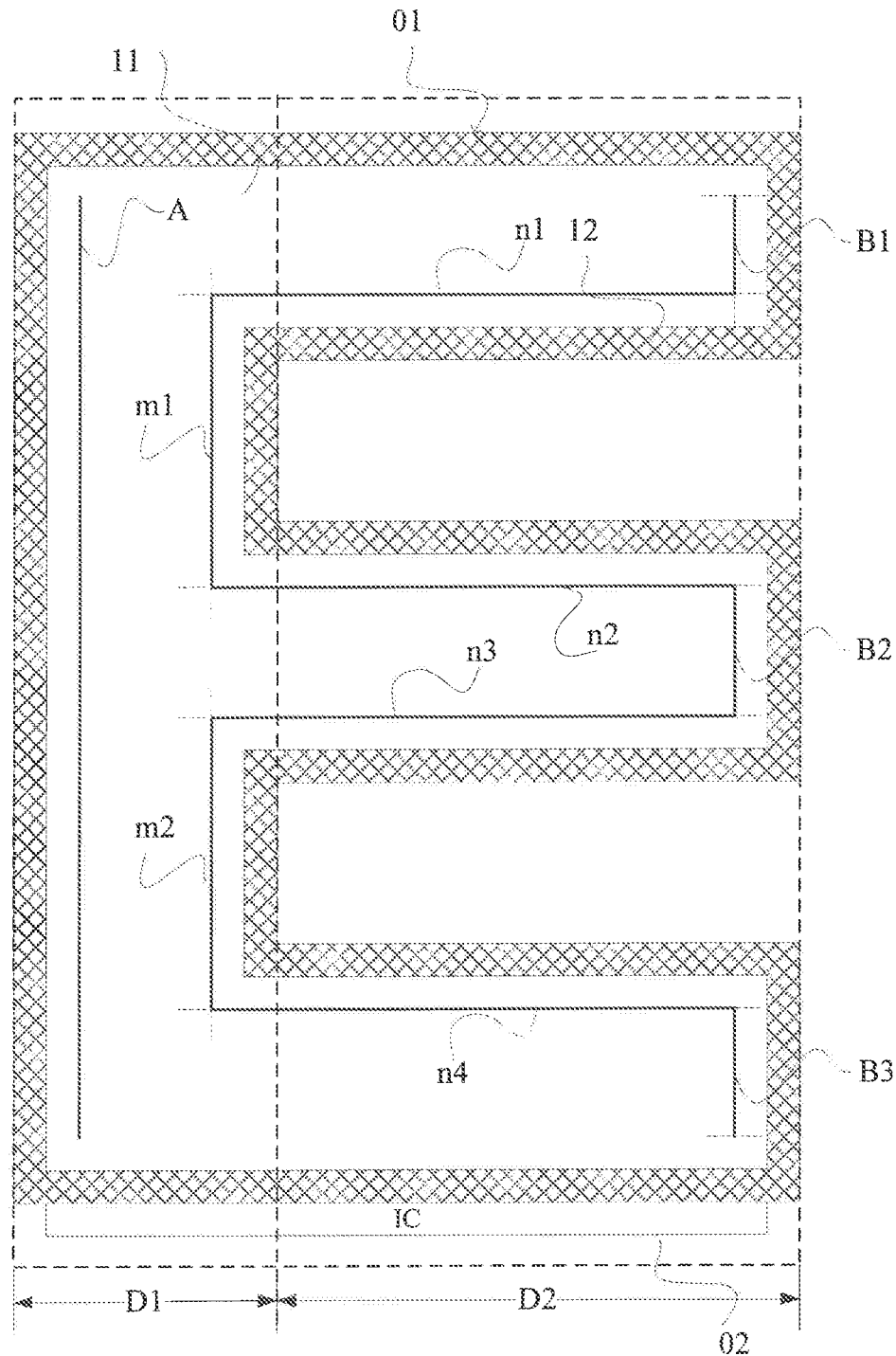
FIG. 2a is a planar schematic view of the structure of a special-shaped display screen provided by an embodiment of the present disclosure.
Figure 2B:
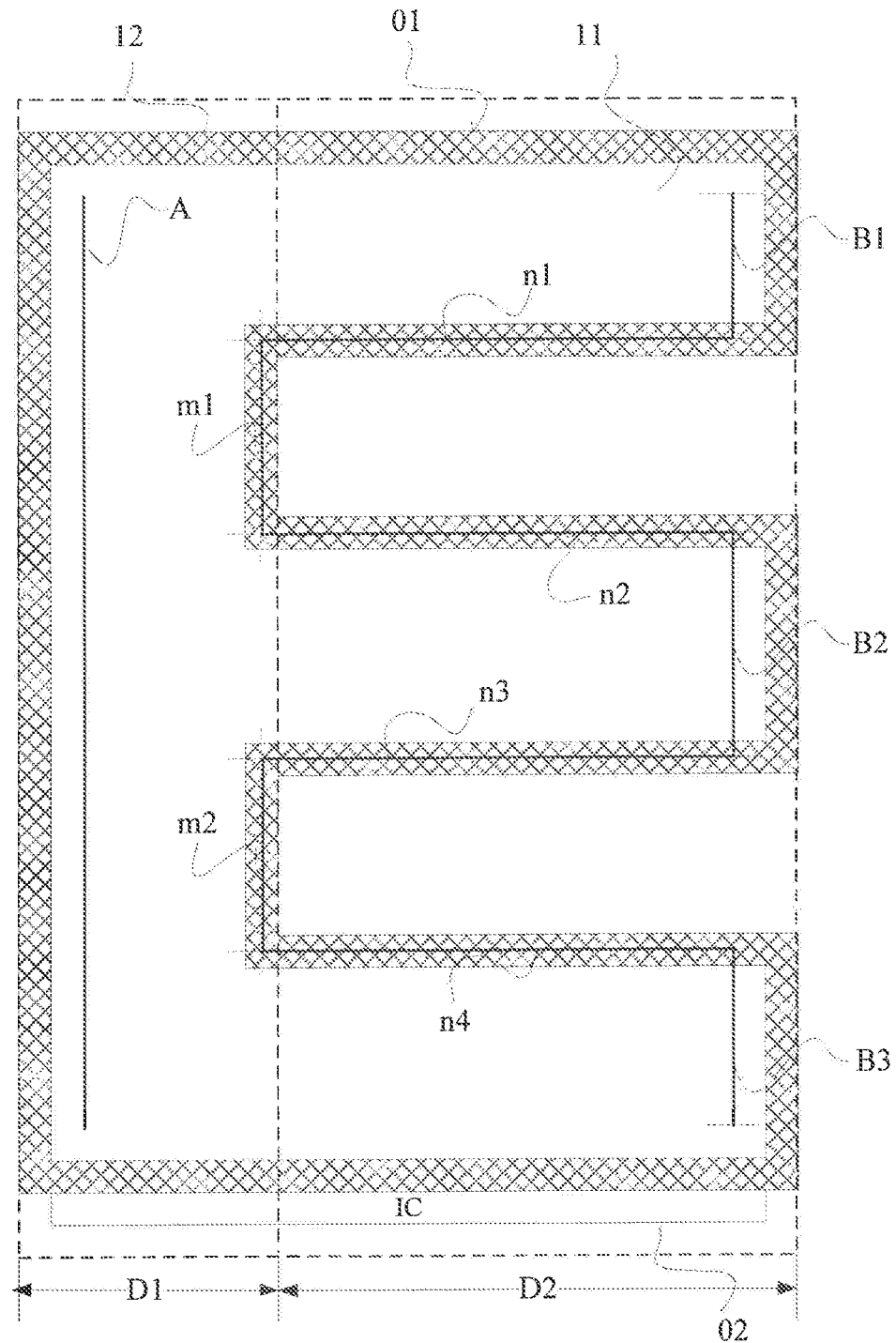
FIG. 2b is a planar schematic view of the structure of a special-shaped display screen provided by an embodiment of the present disclosure.

FIG. 2a is a planar schematic view of the structure of a special-shaped display screen provided by an embodiment of the present disclosure. FIG. 2b is a planar schematic view of the structure of another special-shaped display screen provided by an embodiment of the present disclosure. As shown in FIGS. 2a and 2b, the special-shaped display panel 01 is of an irregular shape, for example the shape of character "E" shown in the drawings. In this case, the display driving circuit 02 is bonded at the upper or lower edge of the special-shaped display panel 01, and the special-shaped display panel 01 can be divided along the short side into a first region D1 with a rectangle shape, and a second region D2 with an irregular shape.

The wiring of the gate lines and the data lines in the first region D1 may be implemented in a conventional design. That is, as shown in FIGS. 2a and 2b, in the active displaying area of the first region D1, the data lines A are arranged as vertical straight lines in the column gaps between sub-pixels, and then the data lines A in the first region D1 run from the active displaying area directly downward into the fanout region of the display driving circuit 02 (IC chip).

Since the active displaying area in the second region D2 is discontinuous, the data lines cannot be arranged upward vertically after running out of the fanout region of the IC chip, and need to be arranged and occupy some sites of the first region D1 or partial space inside the first region D1. Specifically, in the active displaying area of the second region D2, the data lines B1, B2 and B3 are arranged as vertical straight lines in the column gaps between sub-pixels; the data lines B1, B2 and B3 in the second region D2 are connected to the display driving circuit 02 by data lead wires; the data lead wires comprises in particular: vertical data lead wires m1 and m2 arranged in the first region D1 and having an extending direction consistent with that of the data lines B1, B2 and B3, and horizontal data lead wires n1, n2, n3 and n4 which connect the data lines B1, B2 and B3 in the second region D2 with the vertical data lead wires m1 and m2 and have an extending direction consistent with that of the gate lines. That is, as shown in FIGS. 2a and 2b, the data lines B1 are connected successively by the horizontal data lead wire n1, the vertical data lead wire m1 and the horizontal data lead wire n2 to the data line B2, and then successively by the horizontal data lead wire n3, the vertical data lead wire m2 and the horizontal data lead wire n4 to the data line B3, and then connected to the display driving circuit 02.

In a specific embodiment, in order not to interfere with the normal display of each sub-pixel in the special-shaped display panel, the vertical data lead wires m1 and m2 may be in particular arranged in the column gaps between sub-pixels in the active displaying area 11 of the first region D1, as shown in FIG. 2a.

In another specific embodiment, as shown in FIG. 2b, the vertical data lead wires m1 and m2 may also be arranged in the non-displaying area 12 of the first region D1. In this way, it is possible to prevent impact on the aperture ratio of the first region D1 which may be caused by arranging the vertical data lead wires m1 and m2 in the column gaps between respective sub-pixels in the first region D1.

In another specific embodiment, where the design so requires, it is possible that the vertical data lead wires m1 and m2 are arranged partially in the column gaps between sub-pixels in the active displaying area 11 of the first region D1 and partially in the non-displaying area 12. In this way, it can be prevented that too many vertical data lead wires m1 and m2 are arranged in the non-displaying area 12, thus facilitating the design with narrow frame.

Figure 3A:
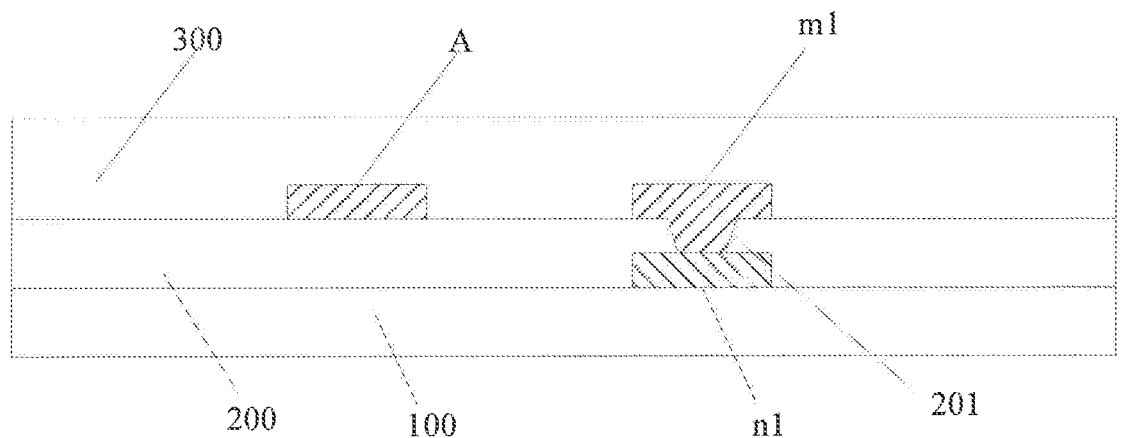
FIG. 3a is a sectional schematic view of the structure of a special-shaped display screen provided by an embodiment of the present disclosure.

FIG. 3a is a sectional schematic view of the structure of a special-shaped display screen provided by an embodiment of the present disclosure. As shown in FIG. 3a, in the above-mentioned special-shaped display panel provided by this embodiment of the present disclosure, in order to reduce the manufacturing processes as far as possible and reduce the number of the masks to be used, the vertical data lead wire m1 and the data line A are arranged in a same layer. In addition, the vertical data lead wire m1 is connected to the horizontal data lead wire n1 through the via hole 201 in the gate insulation layer 200. Under the gate insulation layer 200 is for example a glass substrate 100, and above the gate insulation layer 200 is for example a passivation layer 300.

Figure 3B:
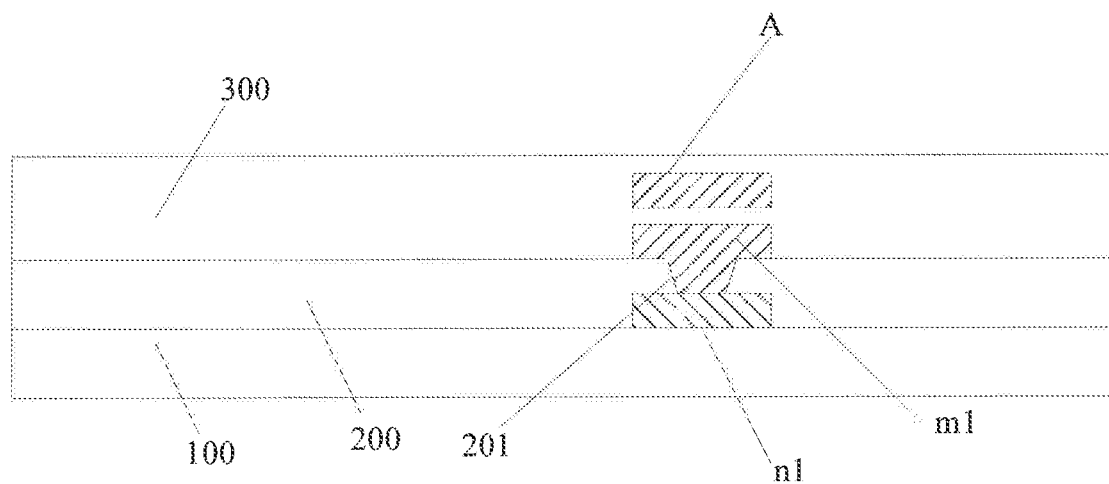
FIG. 3b is a sectional schematic view of the structure of a special-shaped display screen provided by an embodiment of the present disclosure.

FIG. 3b is a sectional schematic view of the structure of a special-shaped display screen provided by another embodiment of the present disclosure. In order to meet the demand on a greater aperture ratio, as shown in FIG. 3b, the vertical data lead wire m1 may be arranged in different layers from the data line A and in such a way that its orthogonal projection on the substrate overlaps at least partially the orthogonal projection of the data line A on the substrate. The vertical data lead wire m1 is connected to the horizontal data lead wire n1 through the via hole 201 in the gate insulation layer 200. Under the gate insulation layer 200 is for example a glass substrate 100, and above the gate insulation layer 200 is for example a passivation layer 300.

In a specific embodiment, in order not to interfere with the normal display of each sub-pixel in the special-shaped display panel, the horizontal data lead wires n1, n2, n3 and n4 may be in particular arranged in the row gaps between sub-pixels in the active displaying area 11, as shown in FIG. 2a.

In another specific embodiment, as shown in FIG. 2b, the horizontal data lead wires n1, n2, n3 and n4 may also be arranged in the non-displaying area. In this way, the impact on the aperture ratio of the active displaying area 11 can be prevented to a certain extent. In another specific embodiment, where the design so requires, it is possible that the horizontal data lead wires n1, n2, n3 and n4 are arranged partially in the row gaps between sub-pixels in the active displaying area and partially in the non-displaying area. In this way, it can be prevented that too many horizontal data lead wires n1, n2, n3 and n4 are arranged in the non-displaying area 12, thus facilitating the design with narrow frame.

Furthermore, in the above-mentioned special-shaped display panel provided by the embodiments of the present disclosure, in order to economize the manufacturing processes as far as possible and reduce the number of the masks to be used, the horizontal data lead wires n1, n2, n3 and n4 may likewise be arranged in a same layer as the gate lines, but this results in loss of aperture ratio. Alternatively, in order to meet the demand on a greater aperture ratio, the horizontal data lead wires n1, n2, n3 and n4 may likewise be arranged in different layers from the gate lines and in such a way that their orthogonal projections on the substrate overlap at least partially orthogonal projections of the gate lines on the substrate, but this results in increase of the number of the masks to be used.

Figure 4A:
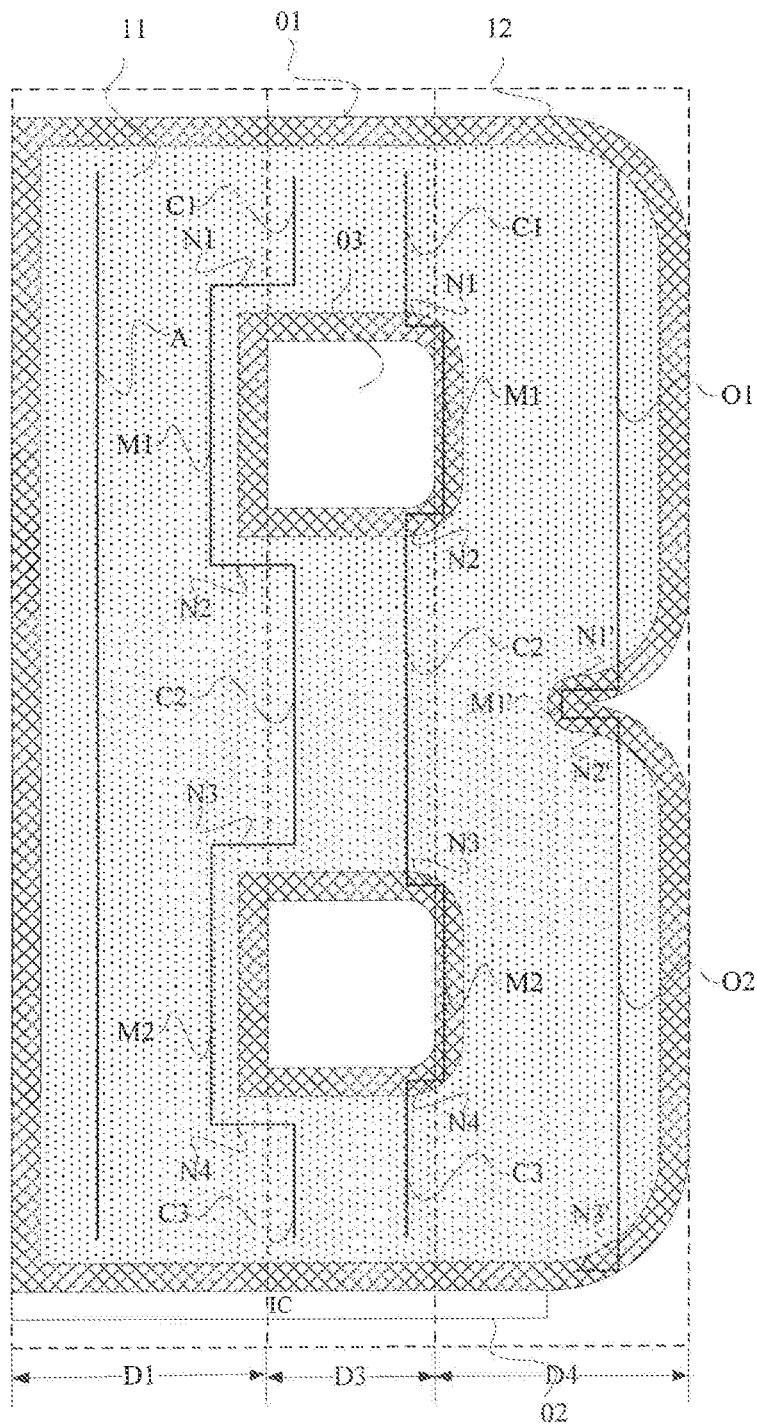
FIG. 4a is a planar schematic view of the structure of a special-shaped display screen provided by an embodiment of the present disclosure.

FIG. 4a is a planar schematic view of the structure of a special-shaped display screen provided by another embodiment of the present disclosure. In the embodiment shown in FIG. 4a, the special-shaped display panel 01 is of an irregular hollow shape, and its outer contour comprises several arc sections with different central angles, such as the shape of character "B" shown in FIG. 4a. In this case, the display driving circuit 02 is bonded at the upper or lower edge of the special-shaped display panel 01; and the special-shaped display panel 01 can be divided along the short side into a first region D1 with a rectangle shape, a third region D3 comprising a hollow portion 03, and a fourth region D4 comprising the arc sections.

The wiring of the data lines in the first region D1 may be implemented in a conventional design. That is, as shown in FIG. 4a, in the active displaying area 11 of the first region D1, the data lines A are arranged as vertical straight lines in the column gaps between sub-pixels, and then the data lines A in the first region D1 run from the active displaying area 11 directly downward into the fanout region of the IC chip.

Since the active displaying area 11 in the third region D3 is discontinuous, the data lines cannot be arranged upward vertical after running out of the fanout region of the IC chip, and need to be arranged on and occupy some sites or partial space of the first region D1 or the fourth region D4. Specifically, in the active displaying area 11 of the third region D3, the data lines C1, C2 and C3 are arranged as vertical straight lines in the column gaps between sub-pixels; and the data lines C1, C2 and C3 in the third region D3 are connected to the display driving circuit 02 by data lead wires. The data lead wires comprises in particular: vertical data lead wires M1 and M2 arranged in the first region D1 or the fourth region D4 and having an extending direction consistent with that of the data lines C1, C2 and C3, and horizontal data lead wires N1, N2, N3 and N4 which connect the data lines C1, C2 and C3 in the third region D3 with the vertical data lead wires M1 and M2 and have an extending direction consistent with that of the gate lines. That is, as shown in FIG. 4a, the data line C1 is connected successively by the horizontal data lead wire N1, the vertical data lead wire M1 and the horizontal data lead wire N2 to the data line C2, and then successively by the horizontal data lead wire N3, the vertical data lead wire M2 and the horizontal data lead wire N4 to the data line C3, and then connected to the display driving circuit 02.

Since the fourth region D4 is of an irregular shape comprising arc sections, there are data lines in the fourth region D4 which cannot be arranged upward vertically. Specifically, in the active displaying area of the fourth region D4, the data lines 01 and 02 are arranged as vertical straight lines in the column gaps between sub-pixels; the data lines 01 and 02 in the fourth region D4 are connected to the display driving circuit 02 by data lead wires. The data lead wires comprises in particular: a vertical data lead wire M1' arranged in the fourth region D4 and having an extending direction consistent with that of the data lines 01 and 02, and horizontal data lead wires N1', N2' and N3' which connect the data lines 01 and 02 in the fourth region D4 with the vertical data lead wire M1' and have an extending direction consistent with that of the gate lines. That is, as shown in FIG. 4a, the data line 01 is connected successively by the horizontal data lead wire N1', the vertical data lead wire M1' and the horizontal data lead wire N2' to the data line 02, and then connected by the horizontal data lead wire N3' to the display driving circuit 02.

In a specific embodiment, in order not to interfere with the normal display of each sub-pixel in the special-shaped display panel, the vertical data lead wires M1 and M2 may be in particular arranged in the column gaps between sub-pixels in the active displaying area, as shown by the data line in left side of the third region D3 in FIG. 4a.

In another specific embodiment, as shown by the data line in right side of the third region D3 in FIG. 4a, the vertical data lead wires M1 and M2 may be arranged in the non-displaying area 12. In this way, the impact on the aperture ratio of the first region D1 can be prevented to a certain extent.

In another specific embodiment, where the design so requires, it is possible that the vertical data lead wires M1 and M2 are arranged partially in the column gaps between sub-pixels in the active displaying area 11 and partially in the non-displaying area 12. In this way, it can be prevented that too many vertical data lead wires M1 and M2 are arranged in the non-displaying area, thus facilitating the design with narrow frame.

Furthermore, in the above-mentioned special-shaped display panel provided by the embodiments of the present disclosure, in order to economize the manufacturing processes as far as possible and reduce the number of the masks to be used, similarly as shown in FIG. 3a, the vertical data lead wire M1 may be arranged in a same layer as the data line A, but this results in loss of aperture ratio.

Alternatively, according to another embodiment, in order to meet the demand on a greater aperture ratio, similarly as shown in FIG. 3b, the vertical data lead wire M1 may be arranged in different layers from the data line A and in such a way that its orthogonal projection on the substrate overlaps at least partially the orthogonal projection of the data line A on the substrate, but this results in increase of the number of the masks to be used.

In the specific implementation, in order not to interfere with the normal display of each sub-pixel in the special-shaped display panel, the horizontal data lead wires N1, N2, N3 and N4 may be in particular arranged in the row gaps between sub-pixels in the active displaying area 11, as shown by the data line in left side of the third region D3 in FIG. 4a.

In another specific embodiment, as shown by the data lines in right side of the third region D3 in FIG. 4a, the horizontal data lead wires N1, N2, N3 and N4 may also be arranged in the non-displaying area. In this way, the impact on the aperture ratio of the displaying area can be prevented to a certain extent.

In another specific embodiment, where the design so requires, it is possible that the horizontal data lead wires N1, N2, N3 and N4 are arranged partially in the row gaps between sub-pixels in the active displaying area and partially in the non-displaying area. In this way, it can be prevented that too many horizontal data lead wires N1, N2, N3 and N4 are arranged in the non-displaying area, thus facilitating the design with narrow frame.

Furthermore, in the above-mentioned special-shaped display panel provided by the embodiments of the present disclosure, in order to economize the manufacturing processes as far as possible and reduce the number of the masks to be used, the horizontal data lead wires N1, N2, N3 and N4 may be arranged in a same layer as the gate lines. Alternatively, in order to meet the demand on a greater aperture ratio, the horizontal data lead wires N1, N2, N3 and N4 may be arranged in different layers from the gate lines and in such a way that their orthogonal projections overlap at least partially orthogonal projections of the gate lines on the substrate.

Figure 4B:
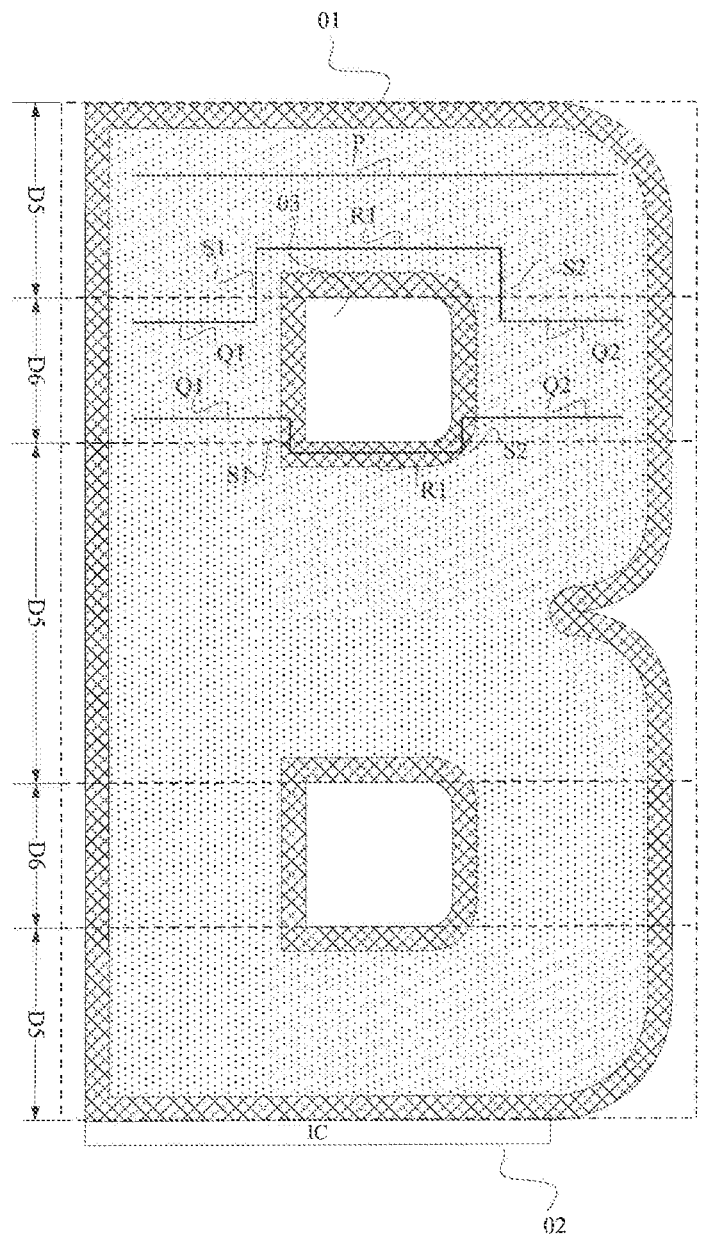
FIG. 4b is a sectional schematic view of the structure of a special-shaped display screen provided by an embodiment of the present disclosure.

FIG. 4b is a sectional schematic view of the structure of a special-shaped display screen provided by an embodiment of the present disclosure. The special-shaped display panel 01 of this embodiment is of an irregular hollow shape, such as the shape of character "B" shown in the drawing. In this case, as shown in FIG. 4b, the special-shaped display panel 01 may also be divided along the long side into a fifth region D5 of a solid closed shape and a sixth region D6 comprising a hollow portion 03.

The wiring of the gate lines in the fifth region D5 may be implemented in a conventional design. That is, as shown in FIG. 4b, in the active displaying area of the fifth region D5, the gate line P is arranged as a horizontal straight line in the row gaps between sub-pixels.

Since the active displaying area in the sixth region D6 is discontinuous, the gate line cannot be arranged exactly horizontally, and need to be arranged and occupy some sites or partial space of the fifth region D5. Specifically, in the active displaying area of the sixth region D6, the gate lines Q1 and Q2 are arranged as horizontal straight lines in the row gaps between sub-pixels; the gate lines Q1 and Q2 in the sixth region D6 are connected to the display driving circuit 02 by gate lead wires. The gate lead wires comprises in particular: a horizontal gate lead wire R1 arranged in the fifth region D5 and having an extending direction consistent with that of the gate line P, and vertical gate lead wires S1 and S2 which connect the gate lines Q1 and Q2 in the sixth region D6 with the horizontal gate lead wire R1 and have an extending direction consistent with that of the data lines. That is, as shown in FIG. 4b, the gate line Q1 is connected successively by the vertical gate lead wire S1, the horizontal gate lead wire R1 and the vertical gate lead wire S2 to the gate line Q2.

The gate signal of the display is consisted of the GOA (gate IC on array) circuit within the display panel, and the clock signal driving the GOA and the enabling signal are integrated into the source driving IC chip 02.

In a specific embodiment, in order not to interfere with the normal display of each sub-pixel in the special-shaped display panel, the horizontal gate lead wire R1 may be in particular arranged in the row gaps between sub-pixels in the active displaying area, as shown by the upper gate line in the sixth region D6 in FIG. 4b.

In another specific embodiment, as shown by the lower gate line in the sixth region D6 in FIG. 4b, the horizontal gate lead wire R1 may be arranged in the non-displaying area 12. In this way, it is possible to prevent impact on the aperture ratio of the fifth region D5 which may arise by arranging the horizontal gate lead wire R1 in the row gaps between sub-pixels.

In another specific embodiment, where the design so requires, it is possible that the horizontal gate lead wire R1 is arranged partially in the row gaps between sub-pixels in the active displaying area 11 and partially in the non-displaying area 12. In this way, it can be prevented that too many horizontal gate lead wires R1 are arranged in the non-displaying area 12, thus facilitating the display panel design with narrow frame.

Figure 5A:
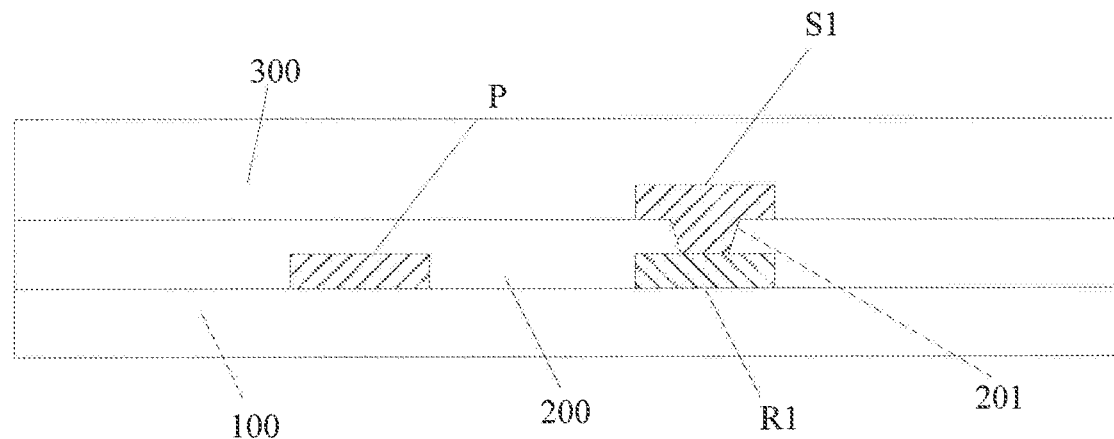
FIG. 5a is a sectional schematic view of the structure of a special-shaped display screen provided by an embodiment of the present disclosure.

FIG. 5a is a sectional schematic view of the structure of a special-shaped display screen provided by an embodiment of the present disclosure. As shown in FIG. 5a, in the above-mentioned special-shaped display panel provided by the embodiments of the present disclosure, in order to economize the manufacturing processes as far as possible and reduce the number of the masks to be used, the horizontal gate lead wire R1 and the gate line P may be arranged in a same layer. In addition, the horizontal gate lead wire R1 is connected to the vertical gate lead wire S1 through the via hole 201 in the gate insulation layer 200. Under the gate insulation layer 200 is for example a glass substrate 100, and above the gate insulation layer 200 is for example a passivation layer 300.

Figure 5B:
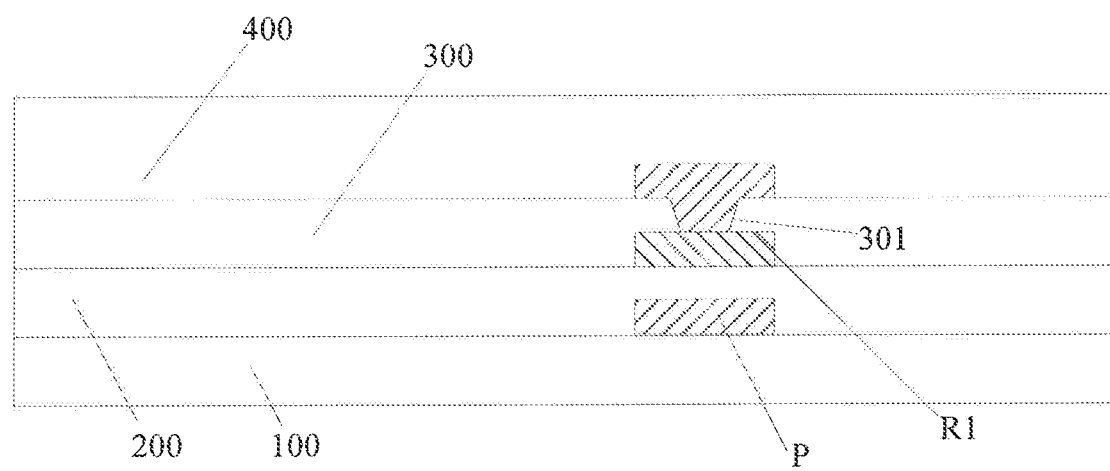
FIG. 5b is a sectional schematic view of the structure of a special-shaped display screen provided by an embodiment of the present disclosure.

FIG. 5b is a sectional schematic view of the structure of a special-shaped display screen provided by an embodiment of the present disclosure. As shown in FIG. 5b, in order to meet the demand on a greater aperture ratio, the horizontal gate lead wire R1 may be arranged in different layers from the gate line P and in such a way that its orthogonal projection on the substrate overlaps at least partially the orthogonal projection of the gate line P on the substrate, but this results in increase of the number of the masks to be used. The horizontal gate lead wire R1 is connected to the vertical gate lead wire S1 through the via hole 301 in the first passivation layer 300. Under the first passivation layer 300 is provided a gate insulation layer 200, under the gate insulation layer 200 is for example a glass substrate 100, and above the first passivation layer 300 is for example a second passivation layer 400.

In a specific implementation, in order not to interfere with the normal display of each sub-pixel in the special-shaped display panel, the vertical gate lead wires S1 and S2 may in particular be arranged in the column gaps between sub-pixels in the active displaying area, as shown by the upper gate line in the sixth region D6 in FIG. 4b.

In another specific embodiment, as shown by the lower gate line in the sixth region D6 in FIG. 4b, the vertical gate lead wires S1 and S2 may also be arranged in the non-displaying area. In this way, the possible impact on the aperture ratio can be prevented which may arise in case where the vertical gate lead wires S1 and S2 are arranged in the column gaps between sub-pixels.

In another specific embodiment, where the design so requires, it is possible that the vertical gate lead wires S1 and S2 are arranged partially in the column gaps between sub-pixels in the active displaying area and partially in the non-displaying area. In this way, it can be prevented that too many vertical gate lead wires S1 and S2 are arranged in the non-displaying area, thus facilitating the display panel design with narrow frame.

Furthermore, in the above-mentioned special-shaped display panel provided by the embodiments of the present disclosure, in order to economize the manufacturing processes as far as possible and reduce the number of the masks to be used, the vertical gate lead wires S1 and S2 may likewise be arranged in a same layer as the data lines, but this results in loss of aperture ratio.

Alternatively, in order to meet the demand on a greater aperture ratio, the vertical gate lead wires S1 and S2 may be arranged in different layers from the data lines and in such a way that their orthogonal projections on the substrate overlap at least partially the orthogonal projections of the data lines on the substrate, but this results in increase of the number of the masks to be used.

In a specific implementation, the special-shaped display panel 01 in the above-mentioned special-shaped display screen provided by the embodiments of the present disclosure may be of the shape of a polygon, a circle, characters "A"-"Z" or numerals "0"-"9", and any combination of these shapes so as to generate the customized special-shaped display apparatus meeting the requirement of the customer, such as a logo.

In a specific implementation, the special-shaped display panel 01 in the above-mentioned special-shaped display screen provided by the embodiments of the present disclosure may be any one selected from a group consisting of a liquid crystal display panel, an electroluminescent display panel, a plasma display panel and an electronic paper. There is not limitation in this respect.

The above-mentioned special-shaped display screen provided by the embodiments of the present disclosure comprises a special-shaped display panel of an irregular shape, and a display driving circuit which is bonded at any edge of the special-shaped display panel and configured to supply respective signals to the gate lines and the data lines in the special-shaped display panel. In the special-shaped display screen provided by the embodiments of the present disclosure, an IC chip which can supply signals to both the gate lines and the data lines is bonded at an edge of the special-shaped display panel, and by this way the other frames of the special-shaped display panel on which no IC chip is bonded can be designed to be narrow frames. Thus, the width of the frames of the special-shaped display screen is reduced as far as possible to realize the display with a special-shaped display having narrow frame.

The embodiments according to another aspect of the present disclosure provide a display apparatus comprising a display screen of any of the above-mentioned embodiments.

Although several specific embodiments of the present disclosure have been described above, the protection scope of the present disclosure is not limited thereto. Insofar as no conflict arises, the respective embodiments may be combined with each other or partially replaced. Obviously, the person skilled in the art can make various modifications and alterations to the present disclosure without departing from the spirit and scope of the disclosure. Thus, if these modifications and alterations of the present disclosure fall within the scope of the claims of the present disclosure and their equivalents, they are intended to be included in the present disclosure.

What is claimed is:

1. A display screen, comprising:
a special-shaped display panel of an irregular shape, the special-shaped display panel comprising a rectangular region and a special-shaped region; and
a display driving circuit which is bonded at an edge of the special-shaped display panel and configured to supply respective signals to gate lines and data lines in the special-shaped display panel respectively;
wherein at least one selected from the gate lines and the data lines in the special-shaped region are connected by lead wires situated inside the special-shaped display panel to the display driving circuit,
wherein the edge at which the display driving circuit is bonded is a short side of a circumscribed rectangle of the special-shaped display panel, and no display driving circuit is bonded at other sides of the special-shaped display panel,
wherein the display driving circuit is configured to supply signals to both the gate lines and the data lines, and wherein:
the special-shaped display panel is of an irregular hollow shape, and its outer contour comprises several arc sections with different central angles;
the special-shaped display panel is divided along the short side into a first region with a rectangle shape, a third region comprising a hollow portion, and a fourth region comprising the arc sections;
in active displaying areas of the first, third and fourth regions, the data lines are arranged as vertical straight lines in column gaps between sub-pixels;
the data lines in the third region are connected to the display driving circuit by first data lead wires;
the first data lead wires comprise:
vertical first data lead wires arranged in the first or fourth region and having an extending direction consistent with that of the data lines; and
horizontal second data lead wires which connect the data lines in the third region with the vertical data lead wires and have an extending direction consistent with that of the gate lines;
the data lines in the fourth region are connected to the display driving circuit by second data lead wires; and
the second data lead wires comprise:
vertical second data lead wires arranged in the fourth region and having an extending direction consistent with that of the data lines; and
horizontal second data lead wires which connect the data lines in the fourth region with the vertical data lead wires and have an extending direction consistent with that of the gate lines.

2. The display screen of claim 1, wherein:
the special-shaped display panel is divided along its long side into a fifth region of a solid shape, and a sixth region comprising a hollow portion;
in active displaying areas of the fifth and sixth regions, the gate lines are arranged as horizontal straight lines in row gaps between sub-pixels;
the gate lines in the sixth region are connected to the display driving circuit by gate lead wires; and
the gate lead wires comprise:
horizontal gate lead wires arranged in the fifth region and having an extending direction of the gate lines; and
vertical gate lead wires which connect the gate lines in the sixth region with the horizontal gate lead wires and have an extending direction consistent with that of the data lines.

3. The display screen of claim 2, wherein the horizontal gate lead wires are arranged in row gaps between sub-pixels, and/or in a non-displaying area.

4. The display screen of claim 3, wherein the horizontal gate lead wires are arranged in a same layer as the gate lines, or the horizontal gate lead wires are arranged in different layers from the gate lines and in such a way that their orthogonal projections on a substrate overlap at least partially orthogonal projections of the gate lines on the substrate.

5. The display screen of claim 1, wherein the special-shaped display panel is of a shape of a character, a shape of a numeral or a shape of a logo comprising a character and/or a numeral.

6. The display screen of claim 1, wherein the special-shaped display panel is any one selected from a group consisting of a liquid crystal display panel, an electroluminescent display panel, a plasma display panel and an electronic paper.

7. A display apparatus comprising the display screen of claim 1.

8. The display screen of claim 1, wherein the lead wires are situated at least partially in the rectangular region.

9. The display screen of claim 3, wherein the vertical gate lead wires are arranged in column gaps between sub-pixels, and/or in a non-displaying area.

10. The display screen of claim 4, wherein the vertical gate lead wires are arranged in a same layer as the data lines, or the vertical gate lead wires are arranged in different layers from the data lines and in such a way that their orthogonal projections on a substrate overlap at least partially orthogonal projections of the data lines on the substrate.

11. The display screen of claim 2, wherein the display panel is of a shape of a character "B", the rectangular region comprises the first and/or fifth region, and the special-shaped region comprises the third, fourth and sixth regions.

* * * * *